United States Patent
Röhr et al.

(10) Patent No.: US 11,365,668 B2
(45) Date of Patent: Jun. 21, 2022

(54) MIXER ASSEMBLY UNIT

(71) Applicant: Eberspächer Exhaust Technology GmbH & Co. KG, Neunkirchen (DE)

(72) Inventors: Benjamin Röhr, Esslingen (DE); Roland Schwarz, Esslingen (DE); Peter Gorke, Stuttgart (DE); Frank Berkemer, Eningen (DE); Tadeusz-Jozef Juroszek, Lichtenwald (DE)

(73) Assignee: PUREM GMBH, Neunkirchen (DE)

( * ) Notice: Subject to any disclaimer, the term of this patent is extended or adjusted under 35 U.S.C. 154(b) by 161 days.

(21) Appl. No.: 16/372,921

(22) Filed: Apr. 2, 2019

(65) Prior Publication Data
US 2019/0301344 A1 Oct. 3, 2019

(30) Foreign Application Priority Data

Apr. 3, 2018 (DE) ...................... 10 2018 107 768.8

(51) Int. Cl.
| | |
|---|---|
| *F01N 13/08* | (2010.01) |
| *F01N 13/18* | (2010.01) |
| *F16L 23/04* | (2006.01) |
| *F01N 3/28* | (2006.01) |
| *B01F 25/10* | (2022.01) |

(Continued)

(52) U.S. Cl.
CPC ............ *F01N 13/082* (2013.01); *B01F 25/10* (2022.01); *B01F 25/4231* (2022.01); *B01F 25/431* (2022.01); *B01F 25/4315* (2022.01); *F01N 3/2892* (2013.01); *F01N 13/1844* (2013.01); *F16L 23/04* (2013.01); *F01N 2240/20* (2013.01)

(58) Field of Classification Search
CPC ............... F01N 13/082; F01N 13/1844; F01N 2240/20; F01N 3/2892; B01F 5/0057; B01F 5/0606; B01F 5/061; B01F 5/0616; F16L 23/04
See application file for complete search history.

(56) References Cited

U.S. PATENT DOCUMENTS 1,182,954 A * 5/1916 Wolf ..................... B01F 5/0616
48/189.4
1,279,771 A * 9/1918 Snider ..................... F02M 1/00
48/189.6

(Continued)

FOREIGN PATENT DOCUMENTS

| | | |
|---|---|---|
| CN | 104131873 A | 11/2014 |
| DE | 202012011764 U1 | 1/2013 |

(Continued)

*Primary Examiner* — Anthony Ayala Delgado
(74) *Attorney, Agent, or Firm* — McGlew and Tuttle, P.C.

(57) ABSTRACT

A mixer assembly unit, especially for an exhaust system of an internal combustion engine of a vehicle, includes a mixer body (48a) with an incoming flow side (58a) and with an outflow side (60a) and with a plurality of flow deflection elements (62b). A carrier area (24a) is provided radially outwards in relation to a mixer longitudinal axis (L) at the mixer body (48a). The carrier area (24a) has an exhaust gas guide element connection area (72a) for permanent connection to a preferably tubular exhaust gas guide element (16a). Radially outside of the exhaust gas guide element connection area (72a), a flange coupling section (88a) couples with a flange coupling section (98a) of another exhaust gas guide element (14a).

18 Claims, 4 Drawing Sheets

(51) Int. Cl.
  *B01F 25/431*   (2022.01)
  *B01F 25/421*   (2022.01)

(56) References Cited

U.S. PATENT DOCUMENTS

| | | | | |
|---|---|---|---|---|
| 1,527,355 | A * | 2/1925 | Gentile | F02M 33/02 |
| | | | | 55/403 |
| 2,703,722 | A * | 3/1955 | Christophersen | F16L 23/20 |
| | | | | 285/340 |
| 7,533,520 | B2 * | 5/2009 | Cheng | B01F 5/0616 |
| | | | | 60/286 |
| 8,875,504 | B2 * | 11/2014 | Tsuchiya | F01N 13/1855 |
| | | | | 60/324 |
| 10,413,874 | B2 * | 9/2019 | Kobayashi | B01F 5/0614 |
| 10,697,347 | B1 * | 6/2020 | Rohr | F01N 3/2066 |
| 2002/0059795 | A1 * | 5/2002 | Durr | F01N 13/1827 |
| | | | | 60/323 |
| 2006/0202480 | A1 * | 9/2006 | Cassel | F16L 23/10 |
| | | | | 285/408 |
| 2009/0262599 | A1 * | 10/2009 | Kohrs | B01F 3/04049 |
| | | | | 366/337 |
| 2010/0071352 | A1 * | 3/2010 | Tatur | B01F 3/02 |
| | | | | 60/287 |
| 2013/0205758 | A1 * | 8/2013 | Tsuchiya | F01N 3/2892 |
| | | | | 60/317 |
| 2014/0077400 | A1 * | 3/2014 | Sampath | B01F 5/0415 |
| | | | | 261/74 |
| 2016/0032809 | A1 * | 2/2016 | Kobe | B01F 5/0616 |
| | | | | 60/324 |
| 2016/0053645 | A1 * | 2/2016 | Sandou | F01N 3/2066 |
| | | | | 60/301 |
| 2018/0100422 | A1 * | 4/2018 | Rohr | B01F 5/0616 |
| 2020/0123955 | A1 * | 4/2020 | Liu | B01F 5/0485 |

FOREIGN PATENT DOCUMENTS

| | | | |
|---|---|---|---|
| DE | 10 2013 201 402 A1 | 8/2013 | |
| DE | 10 2016 120 171 A1 | 4/2018 | |
| EP | 2 474 721 A1 | 7/2012 | |
| WO | WO-2016024207 A1 * | 2/2016 | ............ B01F 5/0616 |

* cited by examiner

MIXER ASSEMBLY UNIT

CROSS REFERENCE TO RELATED APPLICATIONS

This application claims the benefit of priority under 35 U.S.C. § 119 of German Application 10 2018 107 768.8, filed Apr. 3, 2018, the entire contents of which are incorporated herein by reference.

TECHNICAL FIELD

The present invention pertains to a mixer assembly unit, which can be used in an exhaust system of an internal combustion engine of a vehicle to mix reactant injected into the exhaust gas discharged from an internal combustion engine with the exhaust gas.

BACKGROUND

To reduce the pollutant emission especially of diesel internal combustion engines in motor vehicles, it is known that reactant, for example, a urea/water solution, is injected into the exhaust gas discharged by the internal combustion engine in order to carry out a selective catalytic reduction in a catalytic converter device integrated into the exhaust system to reduce the nitrogen oxide content in the exhaust gas. To achieve efficient mixing of the exhaust gas with the reactant injected into this in the process, a mixer, which brings about swirling of the exhaust gas flowing in the exhaust system and hence mixing with the injected reactant with a plurality of blade-like flow deflection elements, is integrated into the exhaust system downstream of the reactant injection and upstream of the catalytic converter device. Such mixers are configured, in general, such that they are accommodated basically in the interior of tubular exhaust gas guide elements of the exhaust system and are carried on the exhaust system in a radially outer area.

An exhaust system known from the subsequently published German patent application DE 10 2016 120 171.5 for an internal combustion engine of a vehicle is generally designated by 10 in FIG. 1. The exhaust system 10 has two tubular exhaust gas guide elements 14, 16 adjoining one another in an upstream area 12. In a junction area 18, these have a respective flange-like coupling section 20 and 22 each, in which these are permanently connected to one another by, for example, bolts passing through the flange-like coupling sections 20, 22. A carrier element 24 of a mixer assembly unit, generally designated by 26, which said carrier element will be described in even more detail below, is positioned between the two flange-like coupling areas 20, 22 and is thus fixed at the exhaust system 10 by means of the bolts, which also pass, for example, through this carrier element, with the two exhaust gas guide elements 14, 16 and with the flange-like coupling sections 20, 22 thereof in the junction area 18.

The junction area 18 is located downstream of a reactant injection device, by means of which a reactant, for example, a urea/water solution, can be injected into the exhaust gas stream. A catalytic converter device, which is generally designated by 28 and in which the mixture of exhaust gas and reactant is subjected to a selective catalytic reduction in order thus to lower the percentage of nitrogen oxide in the exhaust gas, is provided downstream of the junction area 18, adjoining the exhaust gas guide element 16. Via an additional exhaust gas guide element 30, the exhaust gas reaches an exhaust muffler 32, from which this is released to the outside, for example, via two tail pipes 34, 36.

FIG. 2 shows the mixer assembly unit 26 in a perspective view. The mixer assembly unit 26 comprises the carrier element 24, which preferably has a plate-like configuration and which was already mentioned and whose circumferential contour may correspond, for example, essentially to the circumferential contour of the flange-like coupling section 22. Just like the flange-like coupling section 22, the carrier element 24, which is preferably provided as a shaped sheet metal part and has a plate-like configuration, is configured with a ring-like structure and has, at two mutually opposite circumferential areas, radial expansions with openings 38, 40, through which the two flange-like coupling sections 20, 22 and hence the bolts connecting the exhaust gas guide elements 14, 16 can be passed.

To make it possible to combine the carrier element 24 and the mixer assembly unit 26 as a preassembled assembly unit with the exhaust gas guide element 16, the carrier element 24 has fixing straps 42, for example, in the above-mentioned two circumferential areas, which fixing straps have such a bent shape or are bent after positioning the mixing device 26 on the exhaust gas guide element 16 such that they extend behind the flange-like coupling section 22 and thus fix the mixer assembly unit 26 on this. The assembly unit thus composed can then be assembled with the exhaust gas guide element 14 in a simple manner by the flange-like coupling section of said exhaust gas guide element being joined to the flange-like coupling section 22 and to the carrier element 24 and being connected thereto by a screw connection.

Four counter-holding areas 46, at which a mixer body of the mixer assembly unit 26, which said mixer body is generally designated by 48, is secured, are provided at preferably circumferentially uniformly spaced locations in relation to one another in the exemplary embodiment shown at an inner circumferential area of a carrier element body of the carrier element 24, which carrier element body is generally designated by 44, and from which said carrier element body 44 the fixing straps 42 extend as well. Each of the counter-holding areas 46 comprises an inwards protruding, strap-like holding section 50. Each strap-like holding section 50 has an essentially U-shaped configuration and has an outer U-leg 52, an inner U-leg 54 as well as a connection area connecting those. The U-shaped holding sections 50 are shaped such that the holding sections 50 are open in the direction of an incoming flow side 58 of the mixer body 48, which incoming flow side can be seen in FIG. 3, i.e., in the upstream direction, and are closed, especially by the connection area, towards a hidden outflow side 60 of the mixer body 48, i.e., in the downstream direction. Each of the holding sections 50 has an essentially hook-shaped configuration and thus makes it possible to hold the mixer body 48 at the carrier element 24 in a stable manner. The U-leg 52 now extends starting from the carrier element body 44 essentially in the direction of a mixer longitudinal axis and in the direction of the outflow side 60 of the mixer body 48, while the U-leg 54 extends beginning from the connection area 56 essentially parallel to the U-leg 52 in the direction of the incoming flow side 58 of the mixer body 48.

The mixer body 48 comprises a plurality of blade-like flow deflection elements 62, which follow each other in the circumferential direction and extend, for example, essentially radially in relation to the mixer longitudinal axis L. These flow deflection elements 62 start from a central body area 64 of the mixer body 48 and extend radially outwards to a ring-like connection area 66 preferably adjoining the flow deflection elements 62 on the incoming flow side 58.

The mixer body 48 may be provided as an integral component, for example, as a cast metal component, with the central body area 64, with the blade-like flow deflection elements 62 and with the ring-like connection area 66.

In its areas extending between the flow deflection elements 62 following each other directly in circumferential directions and connecting those flow deflection elements 62 to one another, the ring-like connection area 66 provides respective holding areas 70 configured in the form of a holding web 68 for interaction with a respective counter-holding area 46 of the carrier element 24. These holding areas 70, configured as holding webs 68, can be inserted into a holding area receiving space 72 provided by U-shaped holding sections 50 of the counter-holding areas 46, so that the holding sections 50 extend, on the one hand, from radially outwards to radially inwards over the holding areas 70 interacting with these in relation to the mixer longitudinal axis and they extend axially over the holding areas 70 with the inner U-legs 54 also in the direction of the mixer longitudinal axis. The holding webs 68, which are thus located within the holding area receiving spaces in at least some areas, thus cannot move out of the holding sections 50 in the direction of the outflow side 60 of the mixer body 48, i.e., they are secured against excessive axial motion, and they are essentially also centered radially due to interaction with the inner U-legs 54. A defined positioning of the mixer body 48 in relation to the carrier element 24 is thus predefined, and compensation of manufacturing tolerances is made possible based on the holding sections 50 being configured as straps, which can be brought into their desired shape by forming sheet metal material and which also have a certain flexibility.

The mixer body 48 is permanently connected to the carrier element 24 in the area of the holding webs 68 or the holding sections 50 by connection in substance, especially by welding. This welding preferably establishes a connection between the holding webs 68 and the inner U-legs 54, and also preferably for a uniformly stable fixation over the circumference in each of the four counter-holding areas 46 the mixer body 48 is connected in substance by welding with the carrier element 24. It would nevertheless be possible to provide counter-holding areas 46 that can only be used for securing against an excessive axial motion but not for establishing a connection in substance. Further, counter-holding areas and holding areas can be provided that are used only to establish the connection in substance and in which the counter-holding areas do not necessarily have to extend radially over the holding areas.

SUMMARY

An object of the present invention is to provide a mixer assembly unit, which makes it possible to integrate same into an exhaust system in a simple manner.

This object is accomplished according to the present invention by a mixer assembly unit, especially for an exhaust system of an internal combustion engine of a vehicle, comprising a mixer body with an incoming flow side and with an outflow side and with a plurality of flow deflection elements, and a carrier area, which is provided radially outwards in relation to a mixer longitudinal axis at the mixer body, wherein the carrier area has an exhaust gas guide element connection area for a permanent connection to a preferably tubular exhaust guide element and, radially outside of the exit guide element connection area a flange-like (flange shaped/flange) coupling section for coupling with a flange-like coupling section of another exhaust gas guide element.

In the configuration according to the present invention, the mixer assembly unit provides both the formation with which this can be permanently connected to an exhaust gas guide element as well as the formation with which the mixer assembly unit or an exhaust gas guide element permanently connected thereto can be permanently connected to a complementary coupling section of another exhaust gas guide element in a gas-tight manner. This reduces the number of components necessary for building an exhaust system and the number of working steps necessary for assembling an exhaust system.

For a stable connection to an exhaust gas guide element, the exhaust gas guide element connection area may comprise a ring-like (ring shaped/ring) outer connection area, which is to be positioned such that it extends axially over an exhaust gas guide element on the outer side thereof, or/and an inner connection area to be positioned such that it extends axially over an exhaust gas guide element on the inner side thereof.

A defined positioning of the carrier area in relation to the exhaust gas guide element can be supported here by a ring-like (ring shaped/ring) exhaust gas guide element receiving space, which is open essentially in the direction of the mixer longitudinal axis in the direction of the outflow side, being formed between the outer connection area and the inner connection area.

For a uniform and especially also gas-tight connection, for example, by welding, the outer connection area or/and the inner connection area may be configured such that it extends circumferentially without interruption in the circumferential direction about the mixer longitudinal axis.

The flange-like (flange shaped/flange) coupling section may also be configured such that it extends circumferentially without interruption in the circumferential direction about the mixer longitudinal axis for a stable and gas-tight connection to a coupling section of another exhaust gas guide element.

To support the generation of an axially oriented force, which acts on the two coupling sections to be coupled with one another, the flange-like (flange shaped/flange) coupling section may have a coupling element contact surface oriented in the direction of the outflow side.

Provisions may be made in this connection, for example, for the coupling element contact surface to be sloped from radially inwards to radially outwards in the direction away from the outflow side, or/and for the coupling element contact surface to be configured as a truncated cone surface.

It is proposed for a defined contact of the coupling sections to be coupled to one another with one another that the flange-like (flange shaped/flange) coupling section have a coupling section contact surface oriented in the direction away from the outflow side for the contact with a flange-like (flange shaped/flange) coupling section of another exhaust gas guide element.

A radial centering of the two coupling sections in relation to one another can be supported here by the coupling section contact surface being sloped from radially inwards to radially outwards in the direction away from the outflow side, or/and by the coupling section contact surface being configured as a truncated cone surface.

It is proposed for a structurally stable configuration that the coupling element contact surface and the coupling section contact surface be essentially parallel to one another.

To make possible a coupling interaction of the coupling section with the coupling section of another exhaust gas guide element that is not compromised by other system areas, the flange-like (flange shaped/flange) coupling section may be offset axially in relation to the exhaust gas guide element connection area in the direction away from the outflow side.

It is proposed for a stable configuration that can be embodied in a simple manner that the mixer body be manufactured in one piece with the carrier area, preferably as a cast component.

The present invention further pertains to an exhaust gas guide assembly unit, comprising a preferably tubular exhaust gas guide element and, at an axial end area of the exhaust gas guide element, a mixer assembly unit configured according to the present invention.

A connection that is especially also gas-tight can be achieved by the mixer assembly unit being fixed with its carrier area at the axial end area of the exhaust gas guide element by welding.

The present invention further pertains to an exhaust system, especially for an internal combustion engine of a vehicle, comprising an exhaust gas guide assembly unit configured with a mixer assembly unit according to the present invention and another, preferably tubular exhaust gas guide element with a flange-like (flange shaped/flange) coupling section. The flange-like (flange shaped/flange) coupling section of the exhaust gas guide assembly unit may be coupled here with the flange-like (flange shaped/flange) coupling section of the other exhaust gas guide element by a coupling element, which encloses these radially outwards in at least some areas and extends over them radially inwards on the axial sides thereof, which axial sides are oriented facing away from one another.

To support the generation of a force pressing the two flange-like (flange shaped/flange) coupling sections against one another, it is further proposed that the flange-like (flange shaped/flange) coupling section of the other exhaust gas guide element have a preferably truncated cone-like (cons shaped/cone) coupling element contact surface, which is sloped from radially inwards to radially outwards in the direction of the flange-like (flange shaped/flange) coupling section of the exhaust gas guide assembly unit.

Further, the coupling element may have a coupling section receiving space, which receives the flange-like (flange shaped/flange) coupling sections and tapers from radially inwards to radially outwards.

For a defined, especially also self-centering contact of the two coupling sections with one another, it is proposed that the flange-like (flange shaped/flange) coupling section of the other exhaust gas guide element have a preferably truncated cone-like (cone shaped/cone) coupling section contact surface, which is sloped from radially inwards to radially outwards in the direction away from the flange-like (flange shaped/flange) coupling section of the exhaust gas guide assembly unit.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
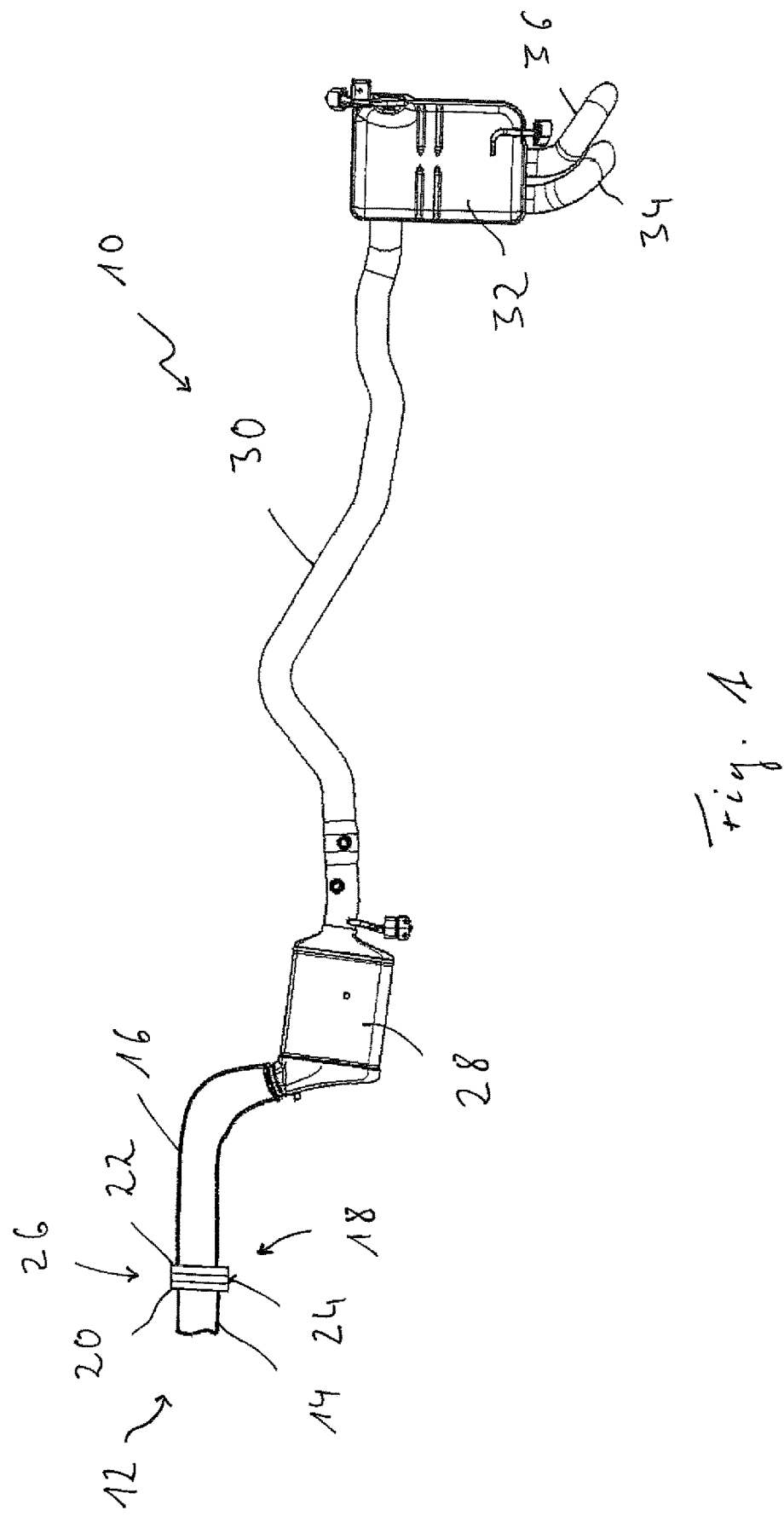
FIG. 1 is a view of an exhaust system of an internal combustion engine of a vehicle, which exhaust system is known from the state of the art.
Figure 2:
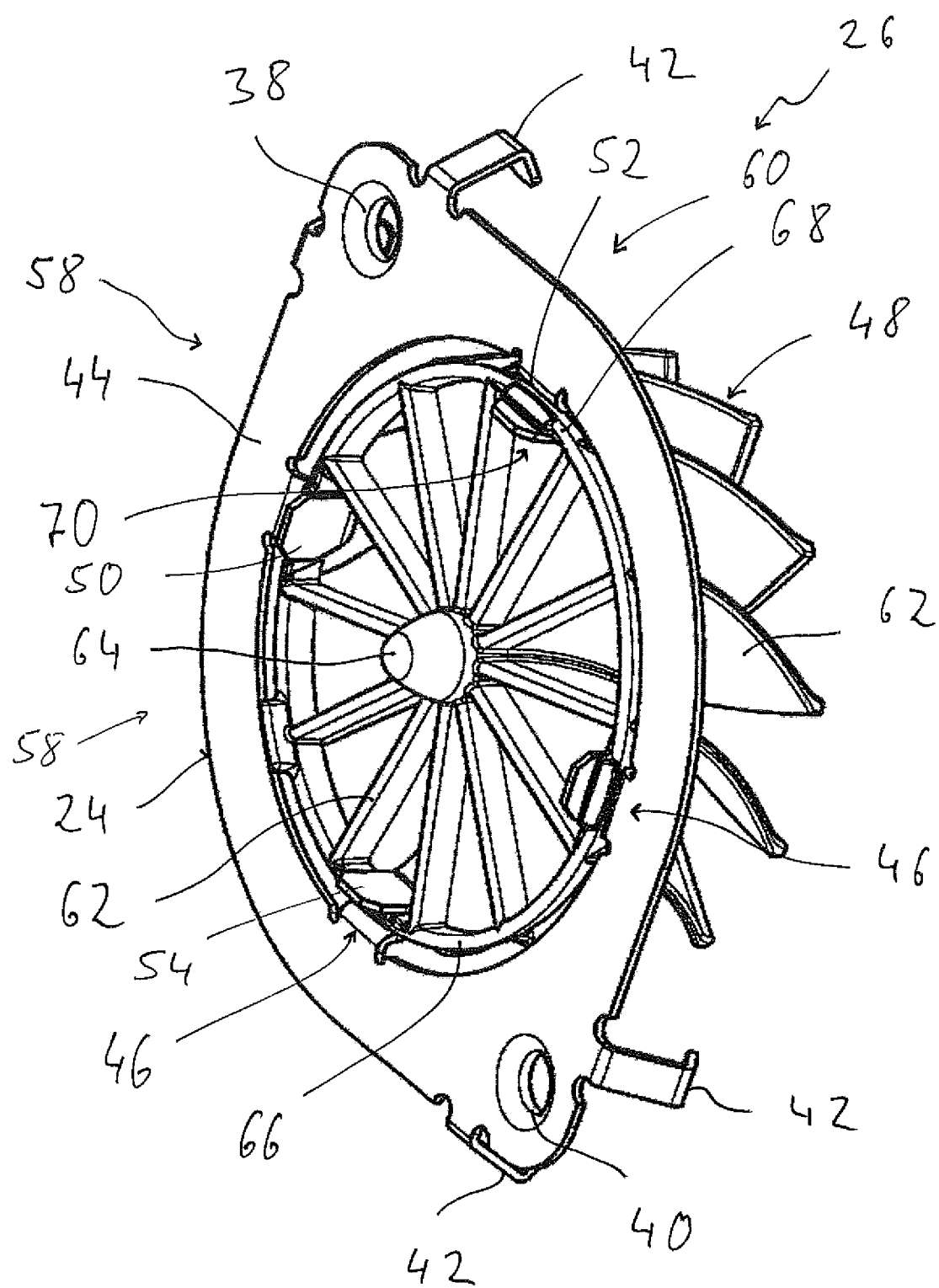
FIG. 2 is a perspective view of a mixer assembly unit of the exhaust system according to FIG. 1.
Figure 3:
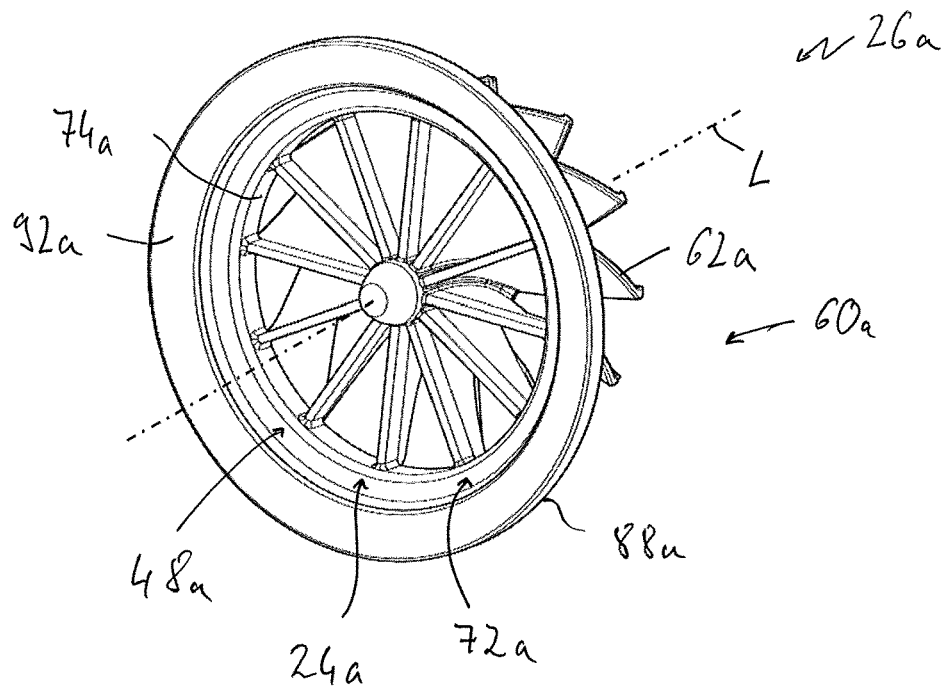
FIG. 3 is a perspective view of a mixer assembly unit configured according to the present invention.
Figure 4:
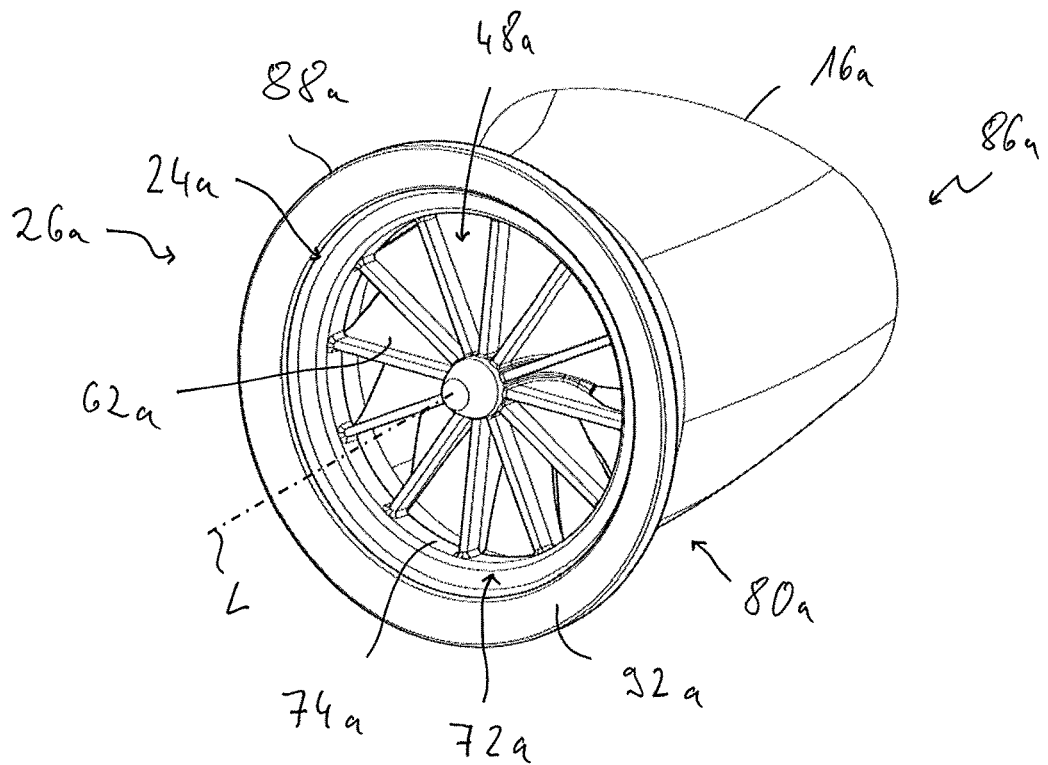
FIG. 4 is a perspective view of the mixer assembly unit according to FIG. 3 in conjunction with a tubular exhaust gas guide element.
Figure 5:
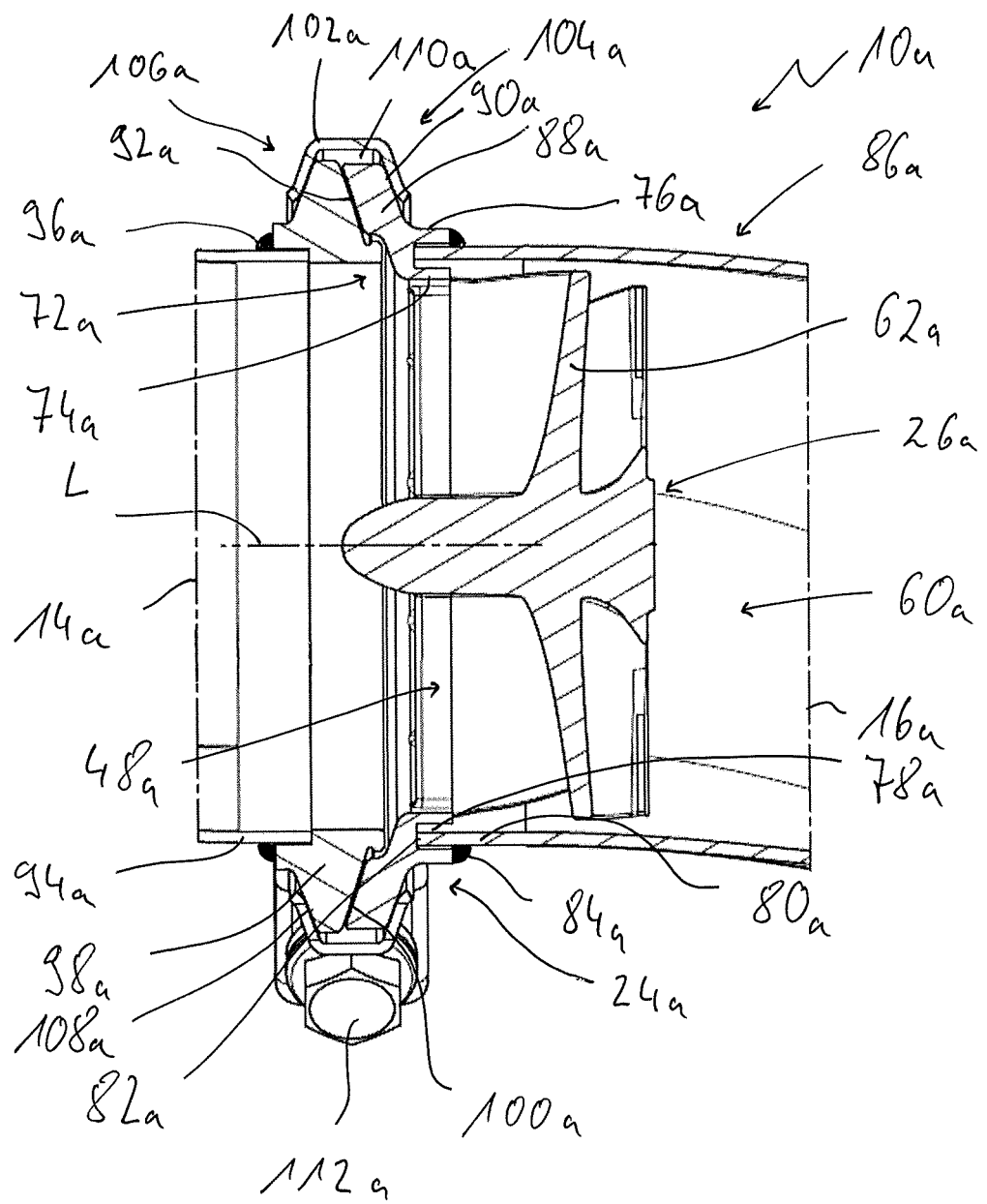
FIG. 5 is a longitudinal sectional view of an exhaust system comprising two tubular exhaust gas guide elements and a mixer assembly unit according to FIG. 3.

Referring to the drawings, FIGS. 3-5 show a mixer assembly unit configured according to the principles of the present invention in conjunction with a tubular exhaust gas guide element and integrated into an exhaust system. Components and system areas that correspond in terms of configuration and function to components and system areas described above with reference to FIGS. 1 and 2 are designated in these figures with the same reference numbers with the suffix "a" added.

In the case of the configuration according to the present invention of a mixer assembly unit 26a, the mixer body 48a is adjoined radially outwards by a carrier area 24a, which is made integral, i.e., in one piece with it. This carrier area 24a replaces the carrier element, which is present in the configuration of a mixer assembly unit described above with reference to FIGS. 1 and 2 and which is configured as a separate component.

The carrier area 24a has a ring-like configuration and encloses the mixer longitudinal axis L essentially without interruption. In its radially inner section adjoining the mixer body 48a, the carrier area 24a provides an exhaust gas guide element connection area 72a. This exhaust gas guide element connection area 72a extending in a ring-like manner about the mixer longitudinal axis L has a ring-like inner connection area 74a, from which, for example, the flow deflection elements 62a following one another in the circumferential direction can also extend. Consequently, a transition is essentially provided in this area between the mixer body 48a and the carrier area 24a.

At a radial distance from the inner connection area 74a, the carrier area 24a has an outer connection area 76a. An exhaust gas guide element receiving space 78a, which is open in the direction of the mixer longitudinal axis L and in the direction of the outflow side 60a of the mixer body 48a, is formed between the inner connection area 74a and the outer connection area 76a. An axial end area 80a of the tubular exhaust gas guide element 16a can be inserted into the exhaust gas guide element receiving space 78a, so that the inner connection area 74a extends axially radially inwards over the end area 80a of the exhaust gas guide element 16a and the outer connection area 76a extends axially radially outwards over the end area 80a of the exhaust gas guide element 16a. For a defined relative positioning, the exhaust gas guide element 16a with its end area 80a may be inserted into the exhaust gas guide element receiving space 78a so far that it adjoins a bottom area 82a defining this space 78a in the axial direction.

In the state, which can also be seen in FIG. 5, and in which the exhaust gas guide element 16a is inserted with its end area 80a into the exhaust gas guide element receiving space

78a, and the carrier area 24a and the entire mixer assembly unit 26a are positioned in a defined manner in relation to the exhaust gas guide element 16a, a permanent connection can be achieved between these two assembly units by forming a weld seam 84a extending preferably over the entire circumference in the circumferential direction about the mixer longitudinal axis L. This weld seam 84a also ensures a gas-tight connection of the carrier area 24a to the exhaust gas guide element 16a. An exhaust gas guide assembly unit 16a, which can be seen in FIG. 4 and which comprises the tubular exhaust gas guide element 16a and the mixer assembly unit 26a connected to the axial end area 80a thereof, is obtained in this manner. The exhaust gas guide assembly unit 86a may be, for example, a front pipe or the like, which leads to a catalytic converter device or to another exhaust gas treatment assembly unit.

For a stable connection of the exhaust gas guide assembly unit 86a to an upstream system area, for example, to the tubular exhaust gas guide element 14a, which may be a pipe leading from a system area of the exhaust system 10a, which system area is positioned farther upstream, or which may be a fitting or the like, the carrier area 24a of the mixer assembly unit 26a further has a flange coupling section generally designated by 88a. This flange coupling section 88a is offset in relation to the exhaust gas guide element connection area 72a in the direction of the mixer longitudinal axis L away from the outflow side 60a and extends essentially radially outside the exhaust gas guide element connection area 72a and, starting from this, radially outwards. The flange coupling section 88a has a coupling element contact surface 90a oriented in the direction of the outflow side 60a. This contact surface 90a is set at an angle in relation to the mixer longitudinal axis L or in a plane extending at right angles thereto and has a, for example, truncated cone-like contour. The coupling element contact surface 90a thus extends from radially inwards to radially outwards in the direction away from the outflow side 60a.

On a flange coupling section 88a axial side, located opposite the coupling element contact surface 90a, the flange coupling section 88a has a coupling section contact surface 92a. This coupling section contact surface 92a, which is consequently oriented away from the outflow side 60a, likewise has a truncated cone-like shape (cone shape) and is thus set at an angle in relation to the mixer longitudinal axis L or to a plane extending at right angles hereto, so that it extends from radially inwards to radially outwards in the direction away from the outflow side 60a. For example, the pitch angle of the coupling section contact surface 92a may correspond to the pitch angle of the coupling element contact surface 90a, so that, for example, truncated cone-like (cone shaped/cone) structures with equal cone angle are obtained here and the two surfaces 90a, 92a are essentially parallel to one another. It would also be possible, in principle, to provide a geometry of these two surfaces that is different from a parallel arrangement, for example, a geometry in which these surfaces converge towards one another radially outwards.

In association with the other exhaust gas guide element 14a, a flange-like (flange shaped/flange) coupling section 98a connected permanently and in a gas-tight manner, for example, by a weld seam 96a, is provided at an axial end area 94a of the exhaust gas guide element 14a. This coupling section 98a has, in association with the coupling section contact surface 92a at the coupling section 88a of the carrier area 24a, a coupling section contact surface 100a oriented in the direction of the outflow side 60a of the mixer body 26a. This contact surface 100a is also set at an angle in relation to the mixer longitudinal axis L or to a plane extending at right angles hereto and it has a geometry corresponding to the geometry of the coupling section contact surface 92a, i.e., for example, also a truncated cone-like (cone shaped/cone) geometry. Thus, the two coupling section contact surfaces 92a, 100a make possible a flat contact of the two coupling sections 88a, 98a with one another, which contact centers the two coupling sections 98a, 88a in relation to one another and thus also establishes a gas-tight connection.

To generate a permanent bond, a coupling element 102a enclosing the two coupling sections 88a, 98a radially inwards is provided. This coupling element 102a, configured with a generally ring-like (ring shaped/ring) structure, extends over the two coupling sections 88a, 98a on their axial sides 104a, 106a, which are facing away from one another, i.e., at the coupling element contact surface 90a of the coupling section 88a and at a corresponding coupling element contact surface 108a of the coupling section 98a. The coupling element contact surface 108a of the coupling section 98a is set at an angle in relation to the mixer longitudinal axis L or to a plane extending at right angles hereto, in such a manner that it extends from radially inwards to radially outwards in the direction of the outflow side 60a of the mixer body 26a. For example, a truncated cone-like (cone shaped/cone) geometry may be provided for the coupling element contact surface 108a here as well. The two coupling element contact surfaces 90a, 108a thus form in the cross section that can be seen in FIG. 5 a structure tapering from radially inwards to radially outwards, which is positioned such that it meshes with a complementarily shaped coupling section receiving space 110a in the coupling element 102a.

The coupling element 102a may be configured, for example, with two circumferential sections, which are connected to one another in an articulated manner and which can be braced against one another in a mutually adjoining circumferential area by a bracing element, for example, a tensioning screw 112a and exert in the process a radially inwards directed force on the two coupling sections 88a, 98a. As a result, the two coupling sections 88a, 98a are pressed axially against one another to an increased extent, and a gas-tight closure is guaranteed in the area of the mutual contact of the coupling section contact surfaces 92a, 100a.

In the configuration according to the present invention of the mixer assembly unit 26a, the latter provides with the mixer body 48a the formation necessary for an efficient mixing of exhaust gas and reactant injected farther upstream and it likewise provides with the carrier area 24a the formation configured for the integration into an exhaust system, which latter formation comprises the exhaust gas guide element connection area 72a, on the one hand, and the flange coupling section 88a, on the other hand. All these formations and functional areas are provided on one and the same assembly unit, which is in turn provided as a single body, i.e., as a single component. This component or this assembly unit may be made from a metallic material, for example, in a casting operation or in a sintering operation.

It should finally be noted that, without departing from the principles of the present invention, various variations may be made in the structural configuration of the mixer assembly unit. For example, the blade-like (blade shaped) flow deflection elements may thus be provided in a different number or with a different geometry. In particular, the coupling sections could also be configured such that the connection of the two coupling sections associated with the different exhaust gas guide elements is not established by a coupling element enclosing these radially and extending over them, but by essentially axially inserted bolts. It is advantageous in this case if the two coupling sections are configured on their axial sides facing mutually away from one another with surfaces extending at right angles to the mixer longitudinal axis L, i.e., with surfaces not set at an angle.

While specific embodiments of the invention have been shown and described in detail to illustrate the application of the principles of the invention, it will be understood that the invention may be embodied otherwise without departing from such principles.

What is claimed is:

1. A mixer assembly unit for an exhaust system of an internal combustion engine of a vehicle, the mixer assembly unit comprising:
    a mixer body with an incoming flow side and with an outflow side and with a plurality of flow deflection elements; and
    a carrier area provided radially outwards in relation to a mixer longitudinal axis at the mixer body, wherein the carrier area comprises an exhaust gas guide element connection area for a permanent connection to an exhaust exit guide element and a flange coupling section, radially outside the exhaust gas guide element connection area, and configured for coupling with a flange coupling section of another exhaust gas guide element;
wherein:
    the exhaust gas guide element connection area comprises a ring shaped outer connection area to be positioned such that the ring shaped outer connection area extends axially over the exhaust gas guide element on an outer side thereof; or
    the exhaust gas guide element connection area comprises a ring shaped inner connection area to be positioned such that the ring shaped inner connection area extends axially over the exhaust gas guide element on the inner side thereof; or
    the exhaust gas guide element connection area comprises a ring shaped outer connection area to be positioned such that the ring shaped outer connection area extends axially over the exhaust gas guide element on an outer side thereof and the exhaust gas guide element connection area comprises a ring shaped inner connection area to be positioned such that the ring shaped inner connection area extends axially over the exhaust gas guide element on the inner side thereof.

2. The mixer assembly unit in accordance with claim 1, wherein a ring shaped exhaust gas guide element receiving space, which is open essentially in a direction of the mixer longitudinal axis in the direction of the outflow side, is formed between the outer connection area and the inner connection area.

3. The mixer assembly unit in accordance with claim 1, wherein:
    the outer connection area is configured such that the outer connection area extends circumferentially without interruption in a circumferential direction about the mixer longitudinal axis; or
    the inner connection area is configured such that the inner connection area extends circumferentially without interruption in a circumferential direction about the mixer longitudinal axis; or
    the outer connection area is configured such that the outer connection area extends circumferentially without interruption in a circumferential direction about the mixer longitudinal axis and the inner connection area is configured such that the inner connection area extends circumferentially without interruption in the circumferential direction about the mixer longitudinal axis.

4. The mixer assembly unit in accordance with claim 1, wherein the flange coupling section of the carrier area is configured such that the flange coupling section of the carrier area extends circumferentially, in a circumferential direction, without interruption about the mixer longitudinal axis.

5. The mixer assembly unit in accordance with claim 1, wherein the flange coupling section of the carrier area has an outflow side coupling element contact surface oriented in a direction of the outflow side.

6. The mixer assembly unit in accordance with claim 5, wherein:
    the outflow side coupling element contact surface is sloped from radially inwards to radially outwards in a direction away from the outflow side; or
    the outflow side coupling element contact surface is configured as a truncated cone surface; or
    the outflow side coupling element contact surface is sloped from radially inwards to radially outwards in a direction away from the outflow side and the outflow side coupling element contact surface is configured as a truncated cone surface.

7. The mixer assembly unit in accordance with claim 1, wherein the flange coupling section of the carrier area has an inflow side coupling section contact surface oriented in the direction away from the outflow side for contact with the flange coupling section of the exhaust gas guide element.

8. The mixer assembly unit in accordance with claim 7, wherein:
    the inflow coupling section contact surface is sloped from radially inwards to radially outwards in the direction away from the outflow side; or
    the inflow coupling section contact surface is configured as a truncated cone surface; or
    the inflow coupling section contact surface is sloped from radially inwards to radially outwards in the direction away from the outflow side and the inflow side coupling section contact surface is configured as a truncated cone surface.

9. The mixer assembly unit in accordance with claim 7, wherein:
    the flange coupling section of the carrier area has an outflow side coupling element contact surface oriented in a direction of the outflow side; and
    the outflow side coupling element contact surface and the inflow side coupling section contact surface are essentially parallel to one another.

10. The mixer assembly unit in accordance with claim 1, wherein the flange coupling section of the carrier area is offset axially in relation to the exhaust gas guide element connection area in the direction away from the outflow side.

11. The mixer assembly unit in accordance with claim 1, wherein the mixer body is manufactured in one piece with the carrier area as a cast component.

12. An exhaust gas guide assembly unit, comprising:
    an exhaust gas guide element; and
    a mixer assembly unit at an axial end area of the exhaust gas guide element, the mixer assembly unit comprising:
    a mixer body with an incoming flow side and with an outflow side and with a plurality of flow deflection elements; and
    a carrier area provided radially outwards in relation to a mixer longitudinal axis at the mixer body, wherein the carrier area comprises an exhaust gas guide element connection area for a permanent connection to the exhaust gas guide element and a radially outward flange coupling section configured for coupling with another guide element flange coupling section;

wherein:

the exhaust gas guide element connection area comprises a ring shaped outer connection area to be positioned such that the ring shaped outer connection area extends axially over the exhaust gas guide element on an outer side thereof; or the exhaust gas guide element connection area comprises a ring shaped inner connection area to be positioned such that the ring shaped inner connection area extends axially over the exhaust gas guide element on the inner side thereof; or the exhaust gas guide element connection area comprises a ring shaped outer connection area to be positioned such that the ring shaped outer connection area extends axially over the exhaust gas guide element on an outer side thereof and the exhaust gas guide element connection area comprises a ring shaped inner connection area to be positioned such that the ring shaped inner connection area extends axially over the exhaust gas guide element on the inner side thereof.

13. The exhaust gas guide assembly unit in accordance with claim 12, wherein the mixer assembly unit is fixed with the carrier area at the axial end area of the exhaust gas guide element by welding.

14. An exhaust system for an internal combustion engine of a vehicle, the exhaust system comprising:
   an exhaust gas guide assembly unit comprising an exhaust gas guide element with a guide element flange coupling section and a mixer assembly unit at an axial end area of the exhaust gas guide element, the mixer assembly unit comprising: a mixer body with an incoming flow side and with an outflow side and with a plurality of flow deflection elements; and a carrier area provided radially outwards in relation to a mixer longitudinal axis at the mixer body, wherein the carrier area comprises an exhaust gas guide element connection area for a permanent connection to the exhaust gas guide element; and
   another exhaust gas guide element having a flange coupling section, the carrier area further comprising a radially outward flange coupling section coupled with the other guide element flange coupling section;
   a coupling element enclosing a portion of the flange coupling section of the carrier area and the flange coupling section of the other exhaust gas guide element, wherein the flange coupling section of the other exhaust gas guide element has a truncated cone coupling element contact surface sloped from radially inwards to radially outwards in the direction of the flange coupling section of the exhaust gas guide assembly unit, the coupling element having a coupling section receiving space, which receives the flange coupling section of the exhaust gas guide assembly unit and the flange coupling section of another exhaust gas guide element and tapers from radially inwards to radially outwards.

15. The exhaust system in accordance with claim 14, wherein the flange coupling section of the other exhaust gas guide element has a truncated cone coupling section contact surface sloped from radially inwards to radially outwards in a direction away from the flange coupling section of the exhaust gas guide assembly unit.

16. A mixer assembly unit for an exhaust system of an internal combustion engine of a vehicle, the mixer assembly unit comprising:
   a mixer body with an incoming flow side and with an outflow side and with a plurality of flow deflection elements; and
   a carrier area provided radially outwards in relation to a mixer longitudinal axis at the mixer body, wherein the carrier area comprises an exhaust gas guide element connection area for a permanent connection to an exhaust guide element and a flange coupling section, radially outside the exhaust gas exit guide element connection area, and configured for coupling with a flange coupling section of another exhaust gas guide element,
   wherein:
   the exhaust gas guide element connection area comprises a ring shaped outer connection area to be positioned such that the ring shaped outer connection area extends axially over the exhaust gas guide element on an outer side thereof and the exhaust gas exit guide element connection area comprises a ring shaped inner connection area to be positioned such that the ring shaped inner connection area extends axially over the exhaust gas guide element on the inner side thereof, a ring shaped exhaust gas guide element receiving space, which is open essentially in a direction of the mixer longitudinal axis in the direction of the outflow side, being formed between the outer connection area and the inner connection area.

17. A mixer assembly unit for an exhaust system of an internal combustion engine of a vehicle, the mixer assembly unit comprising:
   a mixer body with an incoming flow side and with an outflow side and with a plurality of flow deflection elements; and
   a carrier area provided radially outwards in relation to a mixer longitudinal axis at the mixer body, wherein the carrier area comprises an exhaust gas guide element connection area for a permanent connection to an exhaust exit guide element and a flange coupling section, radially outside the exhaust gas guide element connection area, and configured for coupling with a flange coupling section of another exhaust gas guide element;
   wherein the flange coupling section of the carrier area is offset axially in relation to the exhaust gas guide element connection area in the direction away from the outflow side.

18. The mixer assembly unit in accordance with claim 17, wherein:
   the plurality of flow deflection elements extend from a central body area of the mixer body in a radially outward direction.

* * * * *